Dec. 30, 1930.  H. L. GUY  1,786,993
ELASTIC FLUID TURBINE
Filed Oct. 26, 1928

WITNESS
E. Lutz

INVENTOR
H.L Guy
BY a. B. Reavis
ATTORNEY

Patented Dec. 30, 1930

1,786,993

UNITED STATES PATENT OFFICE

HENRY LEWIS GUY, OF HALE, ENGLAND, ASSIGNOR TO WESTINGHOUSE ELECTRIC & MANUFACTURING COMPANY, A CORPORATION OF PENNSYLVANIA

ELASTIC-FLUID TURBINE

Application filed October 26, 1928, Serial No. 315,167, and in Great Britain December 28, 1927.

The invention relates to elastic fluid turbines and concerns particularly the arrangement of the supply and/or exhaust piping for the motive fluid.

In turbines operated by steam or other elastic fluid the dimensions of the turbine cylinder tend to decrease with increased pressure of the motive fluid supply, whilst the stiffness of the piping therefor correspondingly tends to increase. The object of the invention is to minimize the effect of the external forces which the piping may exert upon the cylinder and which may tend to move or distort the latter so as to alter the small clearances which exist between the cylinder and the portions of the rotor.

According to the invention a system of supply and/or exhaust piping for the motive fluid in elastic fluid turbines is provided, wherein the pipes connected to the turbine cylinder and in which substantially similar pressures and temperatures occur, are similarly shaped and symmetrically arranged on opposite sides of a plane containing the longitudinal axis of the cylinder. In some cases these pipes may be connected to a distribution box or receiver which is preferably constrained to move only in the plane of symmetry, whilst in other cases the pipes may be connected to distribution boxes or receivers which are symmetrically disposed with respect to the plane of symmetry aforesaid. Such distribution boxes or receivers may in some cases be free to move in any direction, but where this is undesirable or inconvenient they may be fixed or constrained to move similarly with respect to the axis or the plane of symmetry.

These and other objects are effected by my invention, as will be apparent from the following description and claims taken in connection with the accompanying drawings, forming a part of this application, in which:

Figure 1:
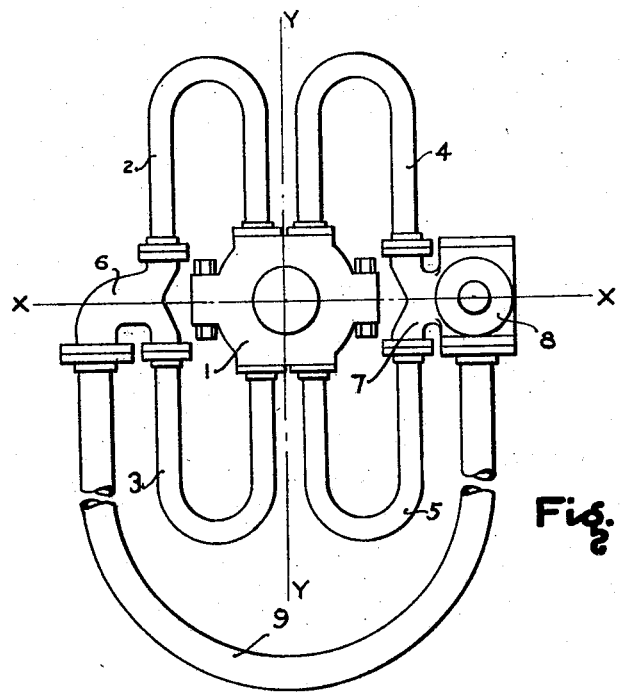
Fig. 1 shows more or less diagrammatically one arrangement viewed in the direction of the turbine axis.

The piping system shown in Fig. 1 is more particularly suitable for the supply of steam to a high pressure turbine cylinder. An axis or plane of symmetry Y—Y is taken vertically through the axis of the turbine cylinder 1 and on opposite sides of this plane are arranged U-shaped steam supply pipes 2, 3 and 4, 5, which are each connected at one end to the turbine cylinder 1. At their other ends the pipes 2, 3 on one side of the plane Y—Y are connected to the branches of a distribution box 6 on one side of the turbine, while pipes 4, 5 are similarly connected to a distribution box 7 on the other side of the turbine. It will be observed from the drawing that the U-pipes are of similar dimensions and in addition to their symmetrical arrangement with respect to the vertical plane Y—Y, are similarly positioned above and below a horizontal plane X—X through the axis of the turbine. Both distribution boxes are connected to a steam chest 8, the box 7 directly and the box 6 through the intermediary of a further U-shaped pipe 9 which passes from one side to the other of the turbine.

It may be desirable to anchor the steam chest 8 securely in position, in which event the distribution box 6 which occupies a corresponding position on the opposite side of the turbine is also anchored. If, however, it should be preferred to mount the steam chest 8 so that it is possible for it to move, the distribution box 6 should be correspondingly mounted so that it can move in a similar manner.

With this arrangement the steam piping connecting the turbine cylinders with the two distribution boxes 6, 7 is symmetrical about both horizontal and vertical planes through the longitudinal axis of the turbine, and consequently any force exerted upon the turbine cylinder by any one of the pipes connected thereto in consequence of variations in temperature or pressure of the motive fluid in such pipe will be correspondingly produced in each of the other pipes connected to the cylinder, so that the summation of the forces and couples exerted on the cylinder by the piping will be substantially nil under all conditions of practice.

Figure 2:
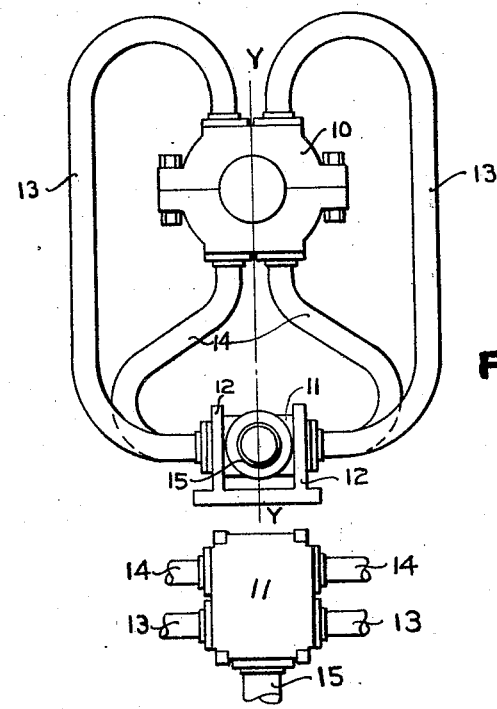
Fig. 2 is a similar view of another arrangement.
Figure 3:
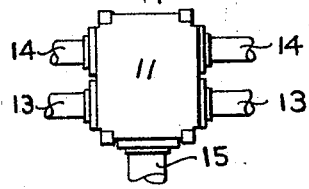
Fig. 3 is a plan corresponding to the lower portion of Fig. 2.

In the arrangement shown in Figs. 2 and 3, which may be conveniently applied to the exhaust end of a high pressure turbine cylinder, a plane of symmetry Y—Y is taken vertically through the axis of the turbine 10 and a 4-way distribution box or receiver 11 is disposed centrally beneath the turbine. The distribution box or receiver 11 is slidable in vertical guides 12 rigidly mounted upon a suitable foundation. The receiver 11 can therefor move in the plane of symmetry towards or away from the turbine axis. Similarly on each side of the plane of symmetry steam pipes 13—13 and 14—14 are connected respectively to the top and bottom of the turbine cylinder and to the receiver 11. The steam pipes enter the receiver 11 laterally and are curved in such a way as to permit a certain degree of flexibility to accommodate slight vertical movements of the receiver 11. By this arrangement also the forces and couples exerted on the cylinder by the various pipes are substantially neutralized, and the cylinder is substantially relieved of vertical forces arising from expansion or contraction of the piping, such as may be occasioned by variations of the temperature or pressure of the motive fluid passing therethrough.

In the case where this construction is employed as an exhaust steam system the receiver 11 may be connected for example to a condenser or to the steam supply system of another turbine or the like in any convenient manner, for example by means of a pipe 15 which may also be arranged to permit some degree of flexibility so as not to obstruct slight vertical movements of the receiver 11. A similar construction may readily be applied to a steam supply system, pipe 15 being in that event connected to the boiler or steam main.

It will be apparent that the invention may be carried out in a variety of ways in some of which it may be preferable to anchor the distribution boxes or to permit them to slide in a predetermined direction or to be free to move in any direction, the piping being arranged in all cases so that there exists no free force or couple tending to move the cylinder, and the risk of the latter undergoing any appreciable distortion due to the expansion or contraction of the piping is substantially eliminated.

While I have shown my invention in two forms, it will be obvious to those skilled in the art that it is not so limited, but is susceptible of various other changes and modifications without departing from the spirit thereof, and we desire, therefore, that only such limitations shall be placed thereupon as are imposed by the prior art or as are specifically set forth in the appended claims.

What I claim is:

1. The combination with an elastic fluid turbine, of a distribution box or receiver disposed laterally of the turbine axis and connected to a source of motive fluid supply, and a plurality of pipes connecting the turbine casing with the distribution box, said pipes being similarly shaped and symmetrically arranged on opposite sides of a plane containing the turbine axis for the purpose of enabling the external forces exerted by said piping upon the turbine casing to substantially counterbalance one another.

2. The combination defined in claim 1, characterized by the fact that said distribution box or receiver is constrained to move only in or parallel to the plane of symmetry.

3. The combination defined in claim 1 characterized in that said distribution box or receiver is free to move in at least one direction in which it may be urged by the piping.

4. The combination defined in claim 1, characterized in that the pipes connected to the turbine cylinder are all of substantially U-form.

5. The combination with an elastic fluid turbine, of a valve chest controlling the supply of motive fluid thereto and disposed laterally of the axis of the turbine, and a plurality of pipes connecting the turbine casing with the valve chest, said pipes being arranged symmetrically with respect to a plane containing the turbine axis for the purpose of enabling the external forces exerted by said piping upon the turbine casing to substantially counterbalance one another.

In testimony whereof, I have hereunto subscribed my name this fifth day of October, 1928.

HENRY LEWIS GUY.